United States Patent
Shah et al.

(10) Patent No.: US 9,568,609 B2
(45) Date of Patent: *Feb. 14, 2017

(54) HIGH SENSITIVITY SATELLITE POSITIONING SYSTEM RECEIVER

(71) Applicant: QUALCOMM Incorporated, San Diego, CA (US)

(72) Inventors: Mayur N. Shah, Millcreek, WA (US); Wyatt Thomas Riley, Chesterbrook, PA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 14/268,676

(22) Filed: May 2, 2014

(65) Prior Publication Data
US 2014/0240173 A1    Aug. 28, 2014

Related U.S. Application Data

(63) Continuation-in-part of application No. 12/779,755, filed on May 13, 2010, now Pat. No. 8,730,101.

(51) Int. Cl.
*G01S 19/25* (2010.01)
*G01S 19/24* (2010.01)
(Continued)

(52) U.S. Cl.
CPC ............ *G01S 19/246* (2013.01); *G01S 19/235* (2013.01); *G01S 19/26* (2013.01)

(58) Field of Classification Search
CPC ........ G01S 19/25; G01S 19/26; G01S 19/235; G01S 19/246
(Continued)

(56) References Cited

U.S. PATENT DOCUMENTS

| 5,440,491 A | 8/1995 | Kawano |
| 5,874,914 A | 2/1999 | Krasner |

(Continued)

FOREIGN PATENT DOCUMENTS

| CN | 1319955 A | 10/2001 |
| CN | 1576881 A | 2/2005 |

(Continued)

OTHER PUBLICATIONS

International Search Report and Written Opinion—PCT/US2011/036506—ISA/EPO—Dec. 2, 2011.

(Continued)

*Primary Examiner* — Harry Liu
(74) *Attorney, Agent, or Firm* — Bala Ramasamy

(57) ABSTRACT

An attenuated satellite positioning system (SPS) signal is acquired using long integration over multiple navigation data bits. To produce a stable internal clock signal to perform the long integration, an external clock signal is received from a highly stable source, such as a wireless communication base station or a nearby femtocell. An internal oscillator is driven at a desired frequency that is aligned with the scaled frequency of the external clock signal to produce the stable internal clock signal. The SPS signal is received and integrated for an extended period using the internal clock signal. Predicted SPS data may be received from an external source and used to perform coherent integration. Alternatively, non-coherent integration may be performed. Additionally, a motion sensor may be used to determine if there is motion relative to the external clock source or to compensate for Doppler errors in the external clock signal due to motion.

17 Claims, 3 Drawing Sheets

(51) Int. Cl.
*G01S 19/23* (2010.01)
*G01S 19/26* (2010.01)

(58) Field of Classification Search
USPC .................................................. 342/357.64
See application file for complete search history.

(56) References Cited

U.S. PATENT DOCUMENTS

| | | | |
|---|---|---|---|
| 6,208,292 | B1 | 3/2001 | Sih et al. |
| 6,252,545 | B1 | 6/2001 | Da et al. |
| 6,522,871 | B1 | 2/2003 | Patrick et al. |
| 6,775,802 | B2 | 8/2004 | Gaal |
| 6,816,111 | B2 | 11/2004 | Krasner |
| 6,928,275 | B1 | 8/2005 | Patrick et al. |
| 7,095,370 | B1 * | 8/2006 | van Diggelen ......... G01S 19/22 342/357.61 |
| 7,251,467 | B2 | 7/2007 | Sendonaris et al. |
| 7,987,047 | B2 | 7/2011 | Ishigami et al. |
| 8,005,174 | B2 | 8/2011 | Abraham et al. |
| 8,072,371 | B2 | 12/2011 | Gum |
| 2006/0071851 | A1 | 4/2006 | Graas et al. |
| 2007/0030841 | A1 | 2/2007 | Lee et al. |
| 2007/0040740 | A1 * | 2/2007 | Abraham ................ G01S 1/045 342/357.59 |
| 2007/0275734 | A1 | 11/2007 | Gaal et al. |
| 2008/0062039 | A1 | 3/2008 | Cohen et al. |
| 2008/0084336 | A1 | 4/2008 | Wang et al. |
| 2008/0154502 | A1 | 6/2008 | Tekawy et al. |
| 2008/0180321 | A1 | 7/2008 | Wang et al. |
| 2009/0030841 | A1 | 1/2009 | Sato et al. |
| 2010/0013702 | A1 | 1/2010 | Lin et al. |
| 2010/0073227 | A1 | 3/2010 | Waters et al. |
| 2011/0080985 | A1 | 4/2011 | Secker et al. |
| 2011/0279317 | A1 | 11/2011 | Shah et al. |

FOREIGN PATENT DOCUMENTS

| | | |
|---|---|---|
| EP | 1008862 A1 | 6/2000 |
| EP | 1122553 A2 | 8/2001 |
| EP | 14919090 A2 | 12/2004 |
| JP | 2001272454 A | 10/2001 |
| JP | 2004198434 A | 7/2004 |
| JP | 2005017198 A | 1/2005 |
| JP | 2006030207 A | 2/2006 |
| JP | 2008545122 A | 12/2008 |
| JP | 2011183590 A | 9/2011 |
| WO | WO-9957929 A1 | 11/1999 |
| WO | WO-0014562 A1 | 3/2000 |
| WO | WO-2006124685 A2 | 11/2006 |

OTHER PUBLICATIONS

Wikepedia Article, "Precision Time Protocol", Apr. 28, 2009 version.
Wikipedia Article, "Network Time Protocol", Apr. 30, 2009 version.

* cited by examiner

HIGH SENSITIVITY SATELLITE POSITIONING SYSTEM RECEIVER

CLAIM OF PRIORITY UNDER 35 U.S.C. §120

The present Application for Patent is a continuation of patent application Ser. No. 12/779,755 filed May 13, 2010, currently pending, and assigned to the assignee hereof and hereby expressly incorporated by reference herein.

BACKGROUND

Obtaining accurate position information for mobile stations, such as cellular or other wireless communication devices, is becoming prevalent in the communications industry. Satellite positioning systems (SPS's) such as, for example, the Global Positioning System (GPS) offers an approach to providing wireless position determination. An SPS user can derive precise navigation information including three-dimensional position, velocity and time of day through information gained from satellite vehicles (SVs) in orbit around the earth. The signals that are received from the SVs are typically rather weak. Therefore, in order to determine the position of the receiver, the receiver must be sufficiently sensitive to receive these weak signals and interpret the information that is represented by them.

One limitation of current SPS receivers is that their operation is limited to situations in which multiple satellites are clearly in view, without obstructions, and where a good quality antenna is properly positioned to receive such signals. SPS signals are severely attenuated in an indoor environment or other areas that suffer from blockage conditions, e.g., with significant foliage or urban canyons. Consequently, determining a position using SPS in environments with blockage conditions or generally weak signals is difficult.

SUMMARY

A device with a satellite positioning system (SPS) receiver and a wireless receiver acquires a weak or attenuated SPS signal using long integration over multiple navigation data bits. To produce a stable clock signal to perform the long integration, an external clock signal is received from a highly stable source such as a wireless communication base station, NTP/PTP (network time protocol, precise time protocol) delivered, e.g., over Ethernet backhaul, or a nearby femtocell. An internal oscillator is driven at a desired frequency that is aligned with the scaled frequency of the external clock signal to produce the stable internal clock signal. The SPS signal is received and integrated for an extended period using the internal clock signal. For example, a received SPS signal may be integrated over multiple navigation data bits using the internal clock at the desired frequency when, e.g., the device is stationary. Predicted SPS data may be received from an external source, e.g., through an Ethernet backhaul, and used to perform coherent integration. Alternatively, non-coherent integration may be performed. Additionally, a motion sensor may be used to determine if there is motion relative to the external clock source or to compensate for Doppler errors in the external clock signal due to motion.

DETAILED DESCRIPTION

Figure 1:
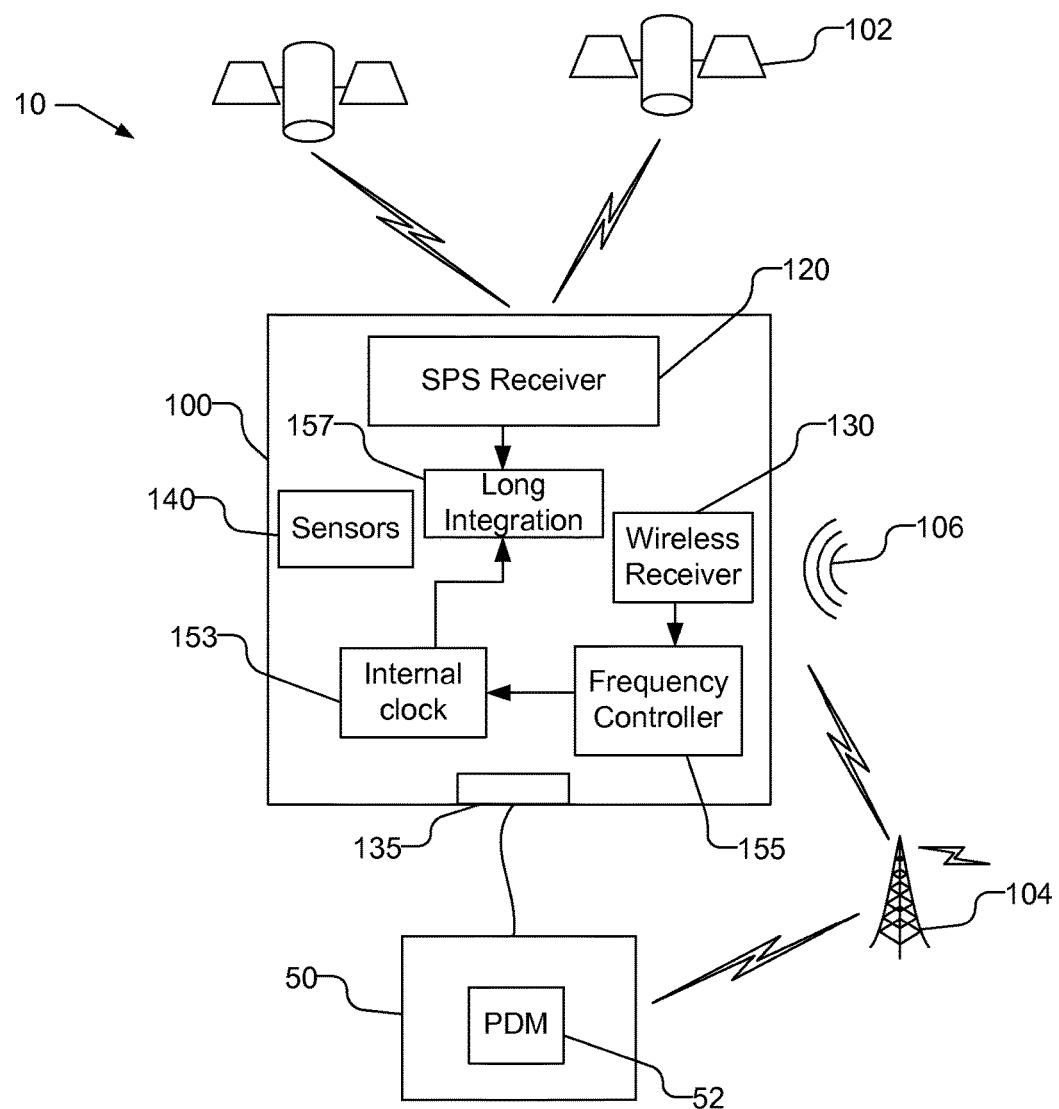
FIG. 1 illustrates a system including a device with a satellite positioning system (SPS) receiver that is capable of tracking a weak or compromised SPS signal.
Figure 2:
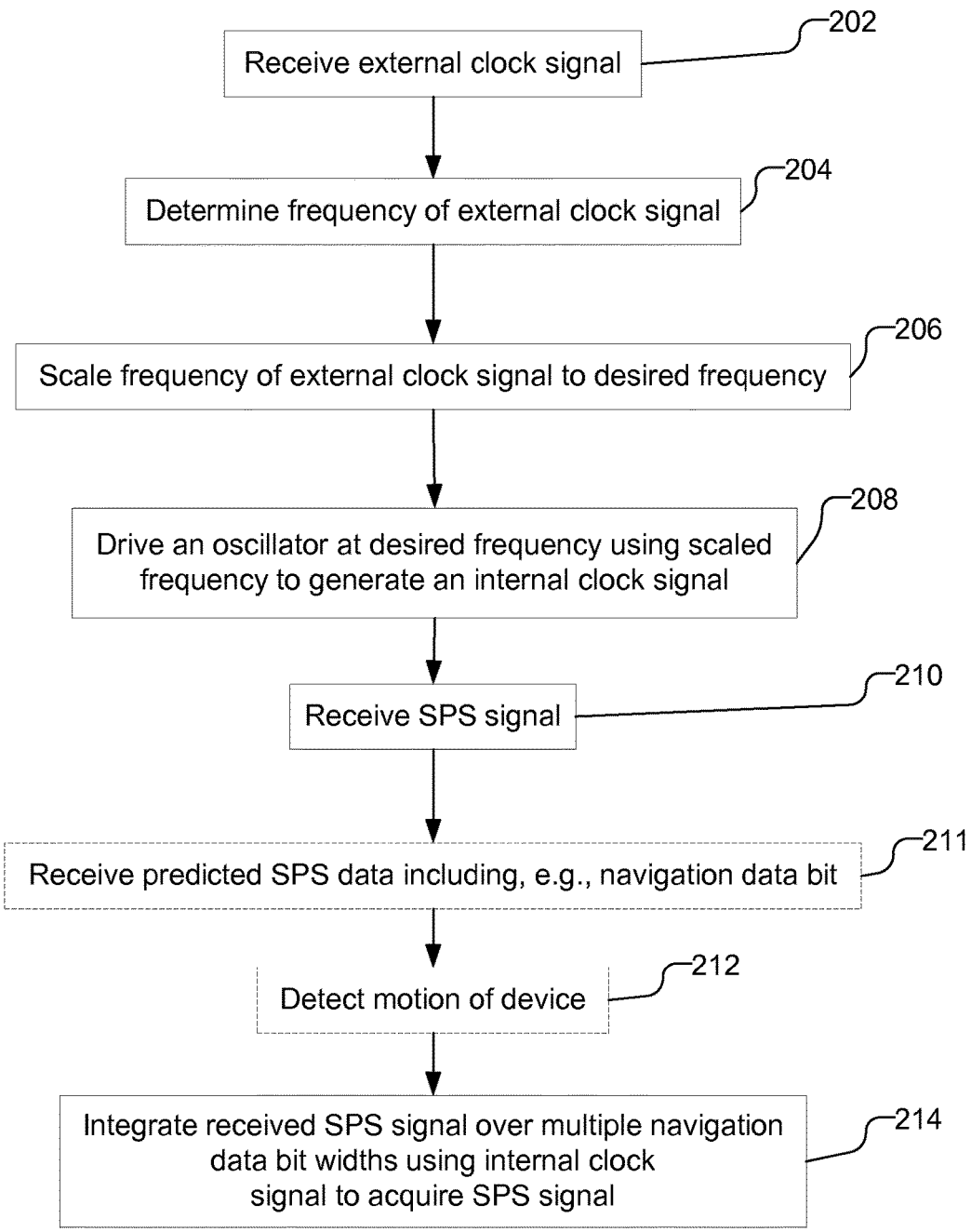
FIG. 2 is a flow chart illustrating a method of tracking a weak or compromised SPS signal.

FIG. 1 illustrates an example of a system 10 including a device 100 with a satellite positioning system (SPS) receiver 120 that is capable of tracking a weak or compromised SPS signal. FIG. 2 is a flow chart illustrating a method of tracking a weak or compromised SPS signal, e.g., with system 10. The device 100 illustrated in FIG. 1 may determine its position and/or be used for navigation based on, e.g., determining its latitude and longitude using signals from a satellite positioning system (SPS), which includes satellite vehicles 102. To achieve the required processing gain to acquire and track a weak SPS signal, the device 100 integrates the SPS for an extended period of time, illustrated schematically in FIG. 1 as long integration block 157. System 10 resolves several factors that limit length of integration of the SPS signal, including clock stability, knowledge of the SPS encoding, and user motion.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or satellite vehicles. In a particular example, such transmitters may be located on Earth orbiting satellite vehicles (SVs) 102, illustrated in FIG. 1. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The device 100 is not limited to use with an SPS for position determination, as position determination techniques described herein may be implemented in conjunction with various wireless communication networks, including cellular towers 104 and from wireless communication access points 106, such as a wireless wide area network (WWAN), a wireless local area network (WLAN), a wireless personal area network (WPAN), and so on. Further the device 100 may access online servers to obtain data, such as satellite images, using various wireless communication networks via cellular towers 104 and from wireless communication access points 106, or using satellite vehicles 102 if desired. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Referring to the flow chart of FIG. 2, in order to acquire an SPS signal using long integration, the device 100 receives an external clock signal (202). To integrate the SPS signal for an extended length of time, the internal clock 153 of the device 100 should remain stable over the period of integration time, to ensure that the signal search is performed in the correct time-frequency bin. The internal clock 153 of most commercial devices, however, uses a low cost oscillator, which generally does not have the clock frequency stability required for long integration. Thus, to generate a stable clock signal, device 100 uses a wireless receiver 130 to receive a highly accurate external clock signal from, e.g., wireless communication base stations 104 (e.g., CDMA base station, GSM/WCDMA base station), wireless access points 106, or a wired signal such as NTP/PTP (network time protocol, precise time protocol) delivered via an Ethernet backhaul at wired communication interface 135 in FIG. 1, or a pilot signal from a nearby femtocell. The external clock signal is provided to a frequency controller 155 that determines the frequency of the external clock signal (204) and scales the external clock frequency to the desired frequency (206). The scaled external clock signal is used to drive an oscillator in the internal clock 153 so that the frequency of the internal clock 153 is aligned with the more accurate scaled external clock signal (208).

The device 100 receives a severely attenuated SPS signal from the satellite vehicles 102 (210). The attenuated SPS signal may be due to blockage conditions, such as found in indoor environments. To improve reception performance, the device 100 integrates the SPS signal for an extended period of time using the modified internal clock signal (214). The integration may be performed coherently or non-coherently.

System 10 may enable coherent integration of the SPS signal by predicting SPS data, including the navigation data bits, and providing the predicted SPS data in the form of SPS sensitivity assistance data to the device 100 (211). As is well known in the art, SPS signals are typically encoded using meander coding, Forward Error Correction (FEC) coding, convolutional coding, and/or the like. In order to coherently integrate the SPS signal for an extended period, the device 100 must decode the SPS signal. However, because device 100 has not locked onto the signal, device 100 cannot detect information within the SPS signal itself to assist in decoding, such as the navigation data bit. Accordingly, system 10 detects the SPS signal at a location external to the device 100 where the SPS signal is stronger. Based on the received SPS signal, SPS data is predicted and provided in the form of a SPS sensitivity assistance signal to the device 100. The predicted SPS data may be used by the device 100, for example, to wipe-off the navigation data modulated onto a SPS spreading signal, which permits an extended coherent integration beyond the duration of the transmitted data symbol of the SPS signal (e.g., greater than 20 ms) thereby improving sensitivity. The use of SPS sensitivity assistance is described in general in U.S. App. No. 2010/0013702, entitled "Methods and Apparatuses For Requesting/Providing Sensitivity Assistance Information Associated with Various Satellite Positioning Systems in Wireless Communication Networks", by Lin et al., filed Jul. 10, 2009, having the same assignee as the present application and which is incorporated herein by reference.

For example, as illustrated in FIG. 1, system 10 includes a location server 50, which includes a position determination module 52. The location server 50 is intended to represent one or more devices and/or one or more specific apparatuses therein that is/are enabled to support, at least in part, such position determination processes. The location server 50 may communicate directly and/or indirectly with device 100 using one or more wired (e.g., Ethernet backhaul) and/or one or more wireless communication links (e.g., wireless communication base stations 104). Hence, in certain example implementations, a location server 50 may take the form of and/or otherwise operatively comprise one or more wireless transmitters, receivers, transceivers, one or more base stations, various wired and/or wireless network resources, one or more computing devices enabled as specific apparatuses, and/or other like computing and/or communication devices. The location server 50 may provide solicited or unsolicited SPS sensitivity assistance data to device 100.

The location server 50 receives the SPS signals from satellite positioning system (SPS), which includes satellite vehicles 102. As is well known, the SPS signals may include navigation information signals and other information signals that are transmitted by an SPS in a native format. Based on at least part of the received SPS signal, the position determination module 52 predicts SPS data and produces an SPS sensitivity assistance signal. Techniques for predicting such SPS data are well known and is described, e.g., in U.S. Pat. No. 6,775,802, entitled "Method, Apparatus, and System for Signal Prediction", by Peter Gaal, having the same assignee as the present application and which is incorporated herein by reference. The SPS sensitivity assistance signal is transmitted by the location server 50 directly and/or indirectly to the device 100. The SPS sensitivity assistance signal may include a time mark, which may be used by the device 100 to compensate for delay in the reception of the SPS sensitivity assistance signal by the device 100. The device 100 may use the received SPS sensitivity assistance signal to assist in the acquisition of the actual SPS signal(s), e.g., employing modulation wipe-off techniques which may significantly increase the sensitivity of an SPS receiver. For example, the SPS sensitivity assistance signal may include navigation data bit information which is used to modulate an SPS signal. With knowledge of the navigation data bit, the device 100 can wipe-off the navigation data modulation, permitting coherent integration over multiple navigation data bits, which may be up to 30 s to 120 s or longer.

If desired, non-coherent integration may be performed over an extended time period, which obviates the need for the predicted SPS data in the SPS sensitivity assistance signal (211) and, thus, location server 50 in system 10 (FIG. 1). Non-coherent integration may be performed, e.g., by squaring the SPS signal, which eliminates the navigation data modulated onto the SPS signal. While non-coherent integration simplifies the system 10 by eliminating the need for location server 50, squaring the SPS signal also reduces the signal to noise ratio (SNR), and thus, may require increased integration time relative to the coherent integration described above.

Another factor that limits the length of integration is motion of the device 100. If the device 100 is substantially stationary, extended integration may be performed because the frequency search windows, satellite movement, Doppler errors due to unknown user dynamics, etc., may be more predictable than if the device is moving, particularly at higher rates of speed. Thus, motion of the device 100 may be detected (212), e.g., using motion/inertial sensors 140, such as accelerometers, magnetometers, and/or gyroscopes, which provides motion related data to the device 100. In one embodiment, device 100 may only conduct searches for a SPS signals using long integration times, when the motion/inertial sensors 140 indicate that the device 100 is stationary. Alternatively, if desired, the motion of the device 100 as determined from the motion/inertial sensors 140 may be used to compensate for any Doppler errors caused by movement of the device 100 with respect to the source of the external clock signal during a search for SPS signals. Of course, where the device 100 is stationary or substantially stationary, for example, when the device 100 is a wireless access point, femtocell or other such device, motion detection (212) may not be necessary, obviating the need for motion/inertial sensors 140.

The device 100 in system 10 may be any device capable of receiving SPS signals as well as an external clock signal. The device 100 may be stationary or semi-stationary (e.g., a femtocell or access point), or a mobile station, for example. As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Figure 3:
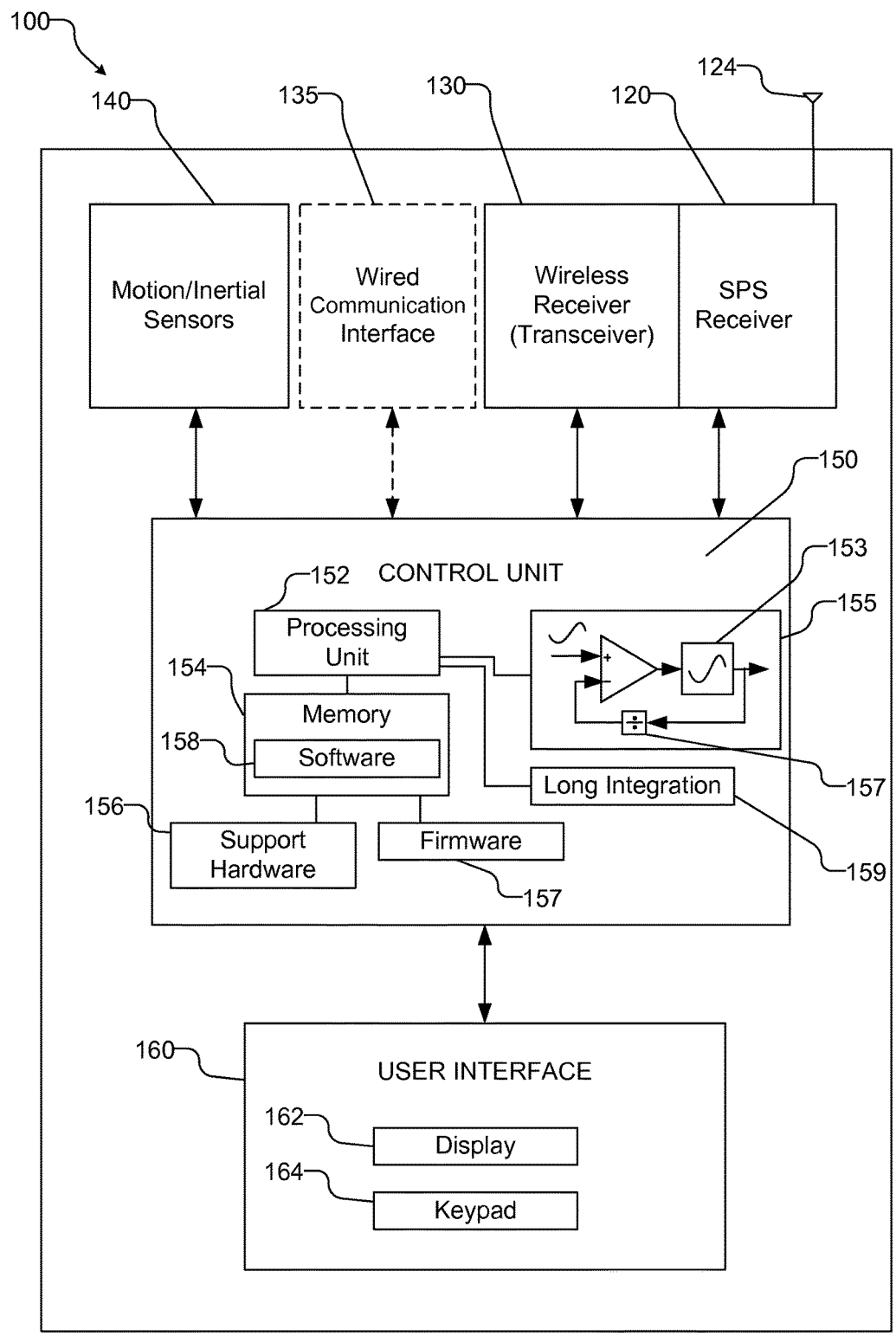
FIG. 3 is a block diagram of an embodiment of the device, which may be used to track an attenuated SPS signal.

FIG. 3 is a block diagram of an embodiment of the device 100, which may be used to track an attenuated SPS signal. The device 100 may include a satellite positioning system (SPS) receiver 120 that receives signals from SPS satellites 102 (FIG. 1) via antenna 124. Device 100 may also include a wireless receiver 130, which may be, e.g., a wireless network radio transceiver that is capable of sending and receiving communications to and from wireless access point 106 and/or communications to and from wireless communication base stations 104 (e.g., CDMA base station, GSM/WCDMA base station) via antenna 124 or a separate antenna. The device 100 may also include an optional wired communication interface 135, e.g., for sending and receiving signals via Ethernet or other wired format. The device 100 may also include motion/inertial sensors 140, which may include, e.g., an accelerometer, gyroscopes, magnetometers or other appropriate device, such as a vehicle odometer or wheel tick sensor, e.g., where device is on a vehicle. The motion/inertial sensors 140 may assist in the determination of motion, e.g., direction and change in position with respect to the source of the external clock signal.

SPS receiver 120, wireless transceiver 130 and motion/inertial sensors 140, if used, can be coupled to and communicate with a control unit 150. The control unit 150 may accept and process data from SPS receiver 120, wireless transceiver 130, and motion/inertial sensors 140 and control the operation of the device. The control unit 150 may be provided by a processing unit 152 and associated memory 154, and may include support hardware 156, software 158, and firmware 157. It will be understood as used herein that the processing unit 152 can, but need not necessarily include, one or more microprocessors, embedded processors, controllers, application specific integrated circuits (ASICs), digital signal processors (DSPs), and the like. The term control unit is intended to describe the functions implemented by the system rather than specific hardware. Moreover, as used herein the term "memory" may refer to any type of computer storage medium, including long term, short term, or other memory associated with the device, and is not to be limited to any particular type of memory or number of memories, or type of media upon which memory is stored.

The control unit 150 includes a frequency controller 155, illustrated here as a phase-locked loop (PLL) and an internal clock 153, illustrated here as a variable oscillator in the PLL. The frequency controller 155 may receive the external clock signal via wireless transceiver 130, which may serve as the input signal to the PLL. As is well known in the art, the input signal of the PLL is compared to the output signal of the PLL in a negative feedback loop using a phase detector. The output signal of the phase detector controls internal clock 153, e.g., variable oscillator. Internal clock 153 may be coupled to processing unit 152. As illustrated, the feedback path includes a frequency divider 157, which may be used to functionally scale the frequency of the external clock signal. Of course, if desired, other methodologies/circuits may be used to scale the external clock signal and control the internal clock 153, such as a frequency-locked loop and/or a frequency synthesizer. By way of example, U.S. Pat. No. 6,928,275, entitled "Method and Apparatus for Compensating Local Oscillator Frequency Error", by Patrick, et al., having the same assignee as the present application and which is incorporated herein by reference, describes techniques for controlling the local oscillator error.

The control unit 150 may also include an integration control unit 159 which is illustrated separately from processing unit 152 for clarity, but may be within the processing unit 152. The integration control unit 159 performs the long integration, either coherently or non-coherently, as discussed above. For the coherent integration, the control unit 150 receives the SPS sensitivity assistance with the predicted SPS data view wireless transceiver 130, with which the processing unit 152 may employ, e.g., modulation wipe-off techniques. The integration control unit 159 may then perform coherent integration for an extended time on the resulting SPS signal. As discussed above, if desired, non-coherent integration may be performed without requiring an SPS sensitivity assistance signal.

The device 100 may also include a user interface 160 that is in communication with the control unit 150, e.g., the control unit 150 accepts data from and controls the user interface 160. The user interface 160 may include a display 162 that may display control menus and positional information. The user interface 160 may further include a keypad 164 or other input device through which the user can input information into the device 100. In one embodiment, the keypad 164 may be integrated into the display 162, such as a touch screen display. The user interface 160 may also include, e.g., a microphone and speaker, e.g., when the device 100 is a cellular telephone.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, code (e.g., software code) may be stored in memory 154 and executed by processing unit 152. Memory may be implemented within the processing unit or external to the processing unit. As used herein the term "memory" may refer to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable medium may take the form of an article of manufacture. Computer-readable media include physical computer storage media. A storage medium may be any available medium that can be accessed by a computer. By way of example, and not limitation, such computer-readable media can comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically, e.g., with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of acquiring a satellite positioning system (SPS) signal for a substantially stationary or semi-stationary device, the method comprising:
   receiving an external clock signal through a wired or wireless interface;
   adjusting a frequency of an oscillator to align the frequency of the oscillator with a scaled frequency of the external clock signal to generate an internal clock signal;
   receiving an SPS signal;
   receiving predicted SPS data through a wired interface; and
   integrating the received SPS signal over multiple navigation data bits using the internal clock signal to acquire the SPS signal.

2. The method of claim 1, wherein the received SPS signal is coherently integrated using the received predicted SPS data.

3. The method of claim 2, wherein the received predicted SPS data includes a predicted value of navigation data bits in the SPS signal, the method further comprising performing a data wipe-off of the received SPS signal using the predicted value of the navigation data bits.

4. The method of claim 2, wherein the predicted SPS data is received through an Ethernet backhaul.

5. The method of claim 1, wherein the received SPS signal is non-coherently integrated.

6. A substantially stationary or semi-stationary device comprising:
   a satellite positioning system (SPS) signal receiver that provides positioning data for the device;
   a transceiver for receiving an external clock signal;
   an internal clock;
   a frequency controller coupled to the internal clock and the transceiver, the frequency controller adjusting a frequency of the internal clock to align the frequency of the internal clock with a scaled frequency of the external clock signal;
a processor coupled to the SPS signal receiver and the transceiver, and configured to receive a signal from the internal clock;
memory coupled to the processor;
a wired communication interface coupled to the processor and configured to receive predicted SPS data; and
software held in the memory and run in the processor to cause the processor to integrate a received SPS signal over multiple navigation data bits using the internal clock at the frequency when the device is stationary.

7. The device of claim 6, the software further causes the processor to coherently integrate the received SPS signal using the predicted SPS data.

8. The device of claim 7, wherein the predicted SPS data includes a predicted value of navigation data bits in the SPS signal, the software further causes the processor to perform a data wipe-off of the received SPS signal using the predicted value of the navigation data bits.

9. The device of claim 6, wherein the software causes the processor to non-coherently integrate the received SPS signal.

10. The device of claim 6, wherein the frequency controller is a phase-locked loop.

11. The device of claim 6, the transceiver comprising a wireless receiver configured for wireless reception of the external clock signal.

12. The device of claim 6, the transceiver comprising a wired interface configured for wired reception of the external clock signal.

13. A substantially stationary or semi-stationary device comprising:
    means for receiving an external clock signal at the device, through a wired or wireless interface;
    means for adjusting a frequency of an oscillator to align the frequency of the oscillator with a scaled frequency of the external clock signal to generate an internal clock signal;
    means for receiving a satellite positioning system (SPS) signal;
    means for receiving predicted SPS data through a wired interface;
    means for integrating the received SPS signal over multiple navigation data bits using the internal clock signal to acquire the SPS signal when the device is stationary.

14. The device of claim 13, wherein the received SPS signal is coherently integrated using the received predicted SPS data.

15. The device of claim 14, further comprising means for performing a data wipe-off of the received SPS signal using the predicted SPS data.

16. The device of claim 13, wherein the received SPS signal is non-coherently integrated.

17. A computer-readable storage medium including program code stored thereon, comprising:
    program code to integrate a received SPS signal over multiple navigation data bits using an internal clock that is adjusted to align a frequency of the internal clock with a scaled frequency of an external clock signal received through a wired or wireless interface of a substantially stationary or semi-stationary device.

* * * * *